US010013251B2

(12) United States Patent
Kim et al.

(10) Patent No.: US 10,013,251 B2
(45) Date of Patent: Jul. 3, 2018

(54) METHOD AND COMPUTER PROGRAM STORED IN COMPUTER-READABLE MEDIUM FOR CONVERTING SORT SCRIPT TO REUSE JCL IN DIFFERENT ENCODING ENVIRONMENT

(71) Applicant: TMAXSOFT CO., LTD., Gyeonggi-do (KR)

(72) Inventors: Hyoseon Kim, Gyeonggi-do (KR); Bumhee Lee, Seoul (KR); Sangyong Park, Gyeonggi-do (KR); Seongbai Jun, Gyeonggi-do (KR)

(73) Assignee: TMAXSOFT CO., LTD., Gyeonggi-Do (KR)

( * ) Notice: Subject to any disclaimer, the term of this patent is extended or adjusted under 35 U.S.C. 154(b) by 41 days.

(21) Appl. No.: 15/206,178

(22) Filed: Jul. 8, 2016

(65) Prior Publication Data
US 2017/0337056 A1  Nov. 23, 2017

(30) Foreign Application Priority Data

May 19, 2016  (KR) .......................... 10-2016-0061535

(51) Int. Cl.
*G06F 9/44*     (2018.01)
*G06F 8/76*     (2018.01)
*G06F 8/36*     (2018.01)

(52) U.S. Cl.
CPC . *G06F 8/76* (2013.01); *G06F 8/36* (2013.01)

(58) Field of Classification Search
CPC ..................................... G06F 8/36; G06F 8/76
USPC .................................................. 717/136–137
See application file for complete search history.

(56) References Cited

U.S. PATENT DOCUMENTS

| 5,878,422 A * | 3/1999 | Roth ......................... G06F 8/78 |
| 5,960,433 A * | 9/1999 | Fujii ......................... G06F 8/75 |
| 2003/0056192 A1* | 3/2003 | Burgess .................... G06F 8/75 717/100 |

(Continued)

OTHER PUBLICATIONS

Oracle, "Oracle Tuxedo Application Rehosting Workbench—Reference Guide", Sep. 2013, Oracle Corporation, 496 pages.*

*Primary Examiner* — Ted T Vo
(74) *Attorney, Agent, or Firm* — Martin & Ferraro, LLP

(57) ABSTRACT

The present disclosure discloses a method and a computer program stored in a computer readable medium for converting a sort script to reuse a JCL in a different encoding environment. An exemplary embodiment of the present disclosure is a sort script converting computer program to reuse a JCL in a different encoding environment, which is stored in a computer readable medium to allow a computer to perform the following steps. The steps includes: a step A of dividing one or more job steps in a job control language (JCL); a step B of extracting an executable program (PGM), a dataset name (DSN), and a data description (DD) from the job step; a step C of obtaining a file description (FD) corresponding to the data description from an executable program source corresponding to the executable program; a step D of generating a first copy book based on the file description; a step E of determining effectiveness by comparing the first copy book with the sort field included in the job step; and a step F of generating and storing a second copy book based on the first copy book in accordance with a determination result of the effectiveness.

11 Claims, 9 Drawing Sheets

(56) References Cited

U.S. PATENT DOCUMENTS

2015/0193243 A1\* 7/2015 Varkhedi ............ G06F 9/45533
718/1

\* cited by examiner

METHOD AND COMPUTER PROGRAM STORED IN COMPUTER-READABLE MEDIUM FOR CONVERTING SORT SCRIPT TO REUSE JCL IN DIFFERENT ENCODING ENVIRONMENT

CROSS-REFERENCE TO RELATED APPLICATIONS

This application claims priority to and the benefit of Korean Patent Application No. 10-2016-0061535 filed in the Korean Intellectual Property Office on May 19, 2016, the entire contents of which are incorporated herein by reference.

TECHNICAL FIELD

The present disclosure relates to a method and a computer program stored in a computer readable medium for converting a sort script to reuse a JCL in a different encoding environment, and more particularly, to a method for analyzing information for converting a script in accordance with an encoding difference when a sort script described in a JCL is executed, a method for providing sort script converting information based on analyzed information, and a computer program which executes the above function.

BACKGROUND ART

In the 1960s to 70s, the government, financial institutions, and major companies introduced a mainframe system to process various data required for enterprise activities. The mainframe system refers to a general purpose large-size computer which employs a center concentration method which connects a plurality of terminals to one computer to perform various jobs. For example, system/360 by IBM is an example of a mainframe system. Mainframe systems have been continuously developed while leading the computing industry of enterprises for almost thirty years since then. However, at the end of the 80s, distributed environments with an open system such as the Unix platform gathered strength and downsizing of open systems became a trend, in order to save system operating costs, so that the position of mainframe systems has been largely weakened.

Differently from a mainframe system, an open system does not depend on a closed technique or program of a specific company. But the interface thereof is open so that the open system is connected or transplanted to a different kind of computer. UNIX is an example of an open system. Recently, there has been an attempt to entirely reconstruct a mainframe system into an open system, which is dangerous and requires high cost, a lot of manpower, and time.

A rehosting solution is suggested as a new alternative method. Rehosting is a high IT system implementation strategy which converts an IT system, which is constructed and operated in a mainframe system environment, into an open environment without redeveloping an application, to be reused as it is. The rehosting may save initial cost and time for the entire redevelopment and fully utilize an existing resource, so that risk is minimized and other various positive effects may be expected.

In order to reuse job control language in a different encoding environment, a sort script needs to be converted, like EBCDIC used in a main frame system and ASCII used in an open system. Therefore, the sorting order may be different between the main frame and the open environment, so that when a field used as a sorting key is configured by a complex field, a study for a method for separating the fields to be sorted by an adaptive encoding is necessary.

RELATED ART DOCUMENT

[Patent Document] Korea Registered Patent No. 10-1379855

SUMMARY OF THE INVENTION

The exemplary embodiment of the present disclosure has been made in an effort to provide a method and a computer program stored in a computer readable medium for converting a sort script to reuse a JCL in a different encoding environment which are capable of automatically converting individual JCLs when sort script encoding is maintained in a Unix environment not by ASCII, but by EBCDIC.

Another exemplary embodiment of the present disclosure has been made in an effort to provide a method and a computer program stored in a computer readable medium for converting a sort script to reuse a JCL in a different encoding environment, which may secure higher speed and precision than those of the related art.

An exemplary embodiment of the present disclosure provides a sort script converting computer program to reuse a JCL in a different encoding environment, which is stored in a computer readable medium to allow a computer to perform the following steps. The steps include: a step A of dividing one or more job steps in a job control language (JCL); a step B of extracting an executable program (PGM), a dataset name (DSN), and a data description (DD) from the job step; a step C of obtaining a file description (FD) corresponding to the data description from an executable program source corresponding to the executable program; a step D of generating a first copy book based on the file description; a step E of determining effectiveness by comparing the first copy book with the sort field included in the job step; and a step F of generating and storing a second copy book based on the first copy book in accordance with a determination result of the effectiveness.

The steps may further include a step G of converting the sort field by referring to the second copy book.

The step B may include extracting the dataset name in a first job step including a sort program when the executable program used in the job step is the sort program and extracting the executable program and the data description in the second job step including the dataset name.

The steps may further include extracting a sort field corresponding to the dataset name in the first job step.

The step C may include searching for an executable program source corresponding to the executable program in a database, extracting a file description corresponding to the data description in the executable program source, obtaining a layout of data corresponding to the dataset name in the file description, and generating the first copy book based on the layout.

The step E may include determining whether the first copy book matches the sort field by comparing the first copy book with the sort field of data corresponding to the dataset name.

The step F may include setting the first copy book as a second copy book when the first copy book matches the sort field of the data as a result obtained by comparing the first copy book with the sort field of data corresponding to the dataset name.

The executable program may include COBOL.

Another exemplary embodiment of the present disclosure provides a sort script converting method to reuse a JCL in a different encoding environment, including: a step A of dividing one or more job steps in a job control language (JCL), a step B of extracting an executable program (PGM), a dataset name (DSN), and a data description (DD) from the job step, a step C of obtaining a file description (FD) corresponding to the data description from an executable program source corresponding to the executable program, a step D of generating a first copy book based on the file description, a step E of determining effectiveness by comparing the first copy book with the sort field included in the job step, a step F of generating and storing a second copy book based on the first copy book in accordance with a determination result of the effectiveness, and a step G of converting the sort field by referring to the second copy book.

Yet another exemplary embodiment of the present disclosure provides a sort script converting device to reuse a JCL in a different encoding environment, including: a job step dividing unit which divides one or more job steps in a job control language (JCL), an extracting unit which extracts an executable program (PGM), a dataset name (DSN), and a data description (DD) from the job step, a file description obtaining unit which obtains a file description (FD) corresponding to the data description from an executable program source corresponding to the executable program, a first copy generating unit which generates a first copy book based on the file description, an effectiveness determining unit which determines effectiveness by comparing the first copy book with the sort field included in the job step, a second copy book generating unit which generates and stores a second copy book based on the first copy book in accordance with a determination result of the effectiveness, and a sort field converting unit which converts the sort field by referring to the second copy book.

According to a method and a computer program stored in a computer readable medium for converting a sort script to reuse a JCL in a different encoding environment of the exemplary embodiment of the present disclosure, data in systems having different code systems may be processed by the same sorting order.

According to a method and a computer program stored in a computer readable medium for converting a sort script to reuse a JCL in a different encoding environment of the exemplary embodiment of the present disclosure, the sort script in the JCL may be automatically converted to be sorted by an order in accordance with an EBCDIC code system.

According to a method and a computer program stored in a computer readable medium for converting a sort script to reuse a JCL in a different encoding environment of the exemplary embodiment of the present disclosure, high speed and precision may be secured as compared with the method of the related art.

However, the effect of the present disclosure is not limited to the above description and other effects which have not been mentioned above will be more apparent to those skilled in the art from reading the following description.

BRIEF DESCRIPTION OF THE DRAWINGS

Various aspects will be described with reference to the drawings and like reference numerals collectively designate like elements. In the following exemplary embodiments, a plurality of specific details will be suggested for more understanding of one or more aspects for the purpose of description. However, it will be apparent that the aspect(s) will be embodied without having the specific details. In other examples, known structures and devices will be illustrated as a block diagram to easily describe the one or more aspects.

DETAILED DESCRIPTION

Figure 1:
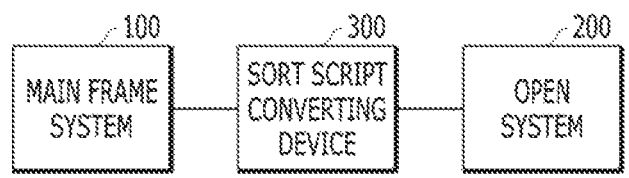
FIG. 1 is a block diagram illustrating a sort script converting system to reuse a JCL in a different encoding environment according to an exemplary embodiment of the present disclosure.

The aforementioned objects, features, and advantages of the present disclosure will be clearer through the following exemplary embodiment associated with the accompanying drawings. The following specific structure or functional explanations are illustrated to describe exemplary embodiments in accordance with the concept of the present disclosure. The exemplary embodiments in accordance with the concept of the present disclosure may be embodied in various forms but are not interpreted to be limited to the exemplary embodiments described in this specification or application.

Various modifications and changes may be applied to the exemplary embodiments in accordance with the concept of the present disclosure and the exemplary embodiments may have various forms so that the exemplary embodiments will be described in detail in the specification or the application with reference to the drawings. However, this does not limit the present disclosure within specific exemplary embodiments, and it should be understood that the present disclosure covers all the modifications, equivalents and replacements within the spirit and technical scope of the present disclosure.

Terms such as first or second may be used to describe various components but the components are not limited by the above terminologies. The above terminologies are used to distinguish one component from the other component, for example, a first component may be referred to as a second component without departing from a scope in accordance with the concept of the present disclosure and similarly, a second component may be referred to as a first component.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween. Other expressions to describe the relationship between elements, that is, expressions such as "between", "immediately between", "adjacent to", or "directly adjacent to" need to be also similarly interpreted.

Terms used in the present specification are used only to describe specific exemplary embodiments, and are not intended to limit the present disclosure. A singular form may include a plural form if there is no clearly opposite meaning in the context. In this specification, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in this specification.

A job control language (hereinafter, abbreviated as JCL) notifies an operating system of what to do, in order to process the data. A JCL is configured by a JCL statement having a series of rules. Which process needs to be performed, that is, which program needs to be executed, or which resource is required for the program may be directed to the operating system by the JCL statement.

The JCL statement may perform the following function. The JCL statement submits the job to the operating system. Further, the JCL statement suggests what to do to the operating system. The JCL statement may request the operating system to allocate a hardware device to a specific dataset or designate a program to be executed.

A series of jobs which are submitted to the operating system by the user to be executed are called an input job stream. The input job stream is configured by one or a plurality of jobs and one job is configured by one or a plurality of steps. Each job may be configured by the following JCL statement. For example, the JCL statement may include "job statement" indicating starting of the job, one or more "EXEC statements" indicating starting of the step, a "DD statement" which defines a dataset required to perform the job step, and a "delimiter statement" indicating input data and ending of the input data.

One step is a minimum job unit which needs to be performed on the same processor in a system having several processors (CPU). In other words, one step may be divided into a plurality of sub steps not to be performed in parallel. Steps in the same job may be performed in parallel by a high degree system processing technique. However, whether to perform and a parallel performing degree are determined by a system environment and a job characteristic.

The job statement may notify the operating system of the starting of the job. The job statement may designate information for distinguishing the job and a parameter required to perform the job. Further, one job ends when a next job statement is found or a NULL statement is found.

The job step starts with an EXEC statement which designates a name of a program to be executed. One or a plurality of job steps is present in one job. One job step ends when the job step meets a next EXEC statement, a job statement, or a NULL statement.

A DD statement designates a dataset (which is similar to a file in a UNIX server) which is required by the program. One dataset is designated by one DD statement. The DD statement designates a name of a dataset, an input/output device to be used, a location of a dataset, an allocating method, and other dataset characteristic.

Hereinafter, an exemplary embodiment of the present disclosure will be described in more detail with reference to the accompanying drawings.

FIG. 1 is a block diagram illustrating a sort script converting system to reuse a JCL in a different encoding environment according to an exemplary embodiment of the present disclosure.

Referring to FIG. 1, a sort script converting system according to an exemplary embodiment of the present disclosure may include a mainframe system 100, an open system 200, and a sort script converting device 300.

For example, the mainframe system 100 is a termin used in an industrial world which refers to a large size computer created by a large company such as IBM. The mainframe system 100 is mainly used for a computing job required for business activities of very large companies such as a major company or a financial institution. The mainframe system 100 is configured not by a distributed computing method, but by a center concentration method.

The open system 200 is an industrial term which calls for a method for designing hardware H/W and software S/W of different computer manufacturers to be linked to each other. The open system 200 may be divided into fields such as an operating system and communication. Here, the open system is a middle-size computer in which an operating system such as UNIX or Linux is loaded.

The sort script converting device 300 divides one or more job steps from the job control language (JCL) of the mainframe system 100 and extracts an executable program (PGM), a dataset name (DSN), and a data description (DD) from the divided job step. Thereafter, the sort script converting device 300 obtains a file description (FD) corresponding to the data description from the executable program source corresponding to the executable program and creates a first copy book based on the obtained file description. The sort script converting device 300 determines the effectiveness by comparing the created first copy book with a sort field included in the job step and then creates a second copy book based on the first copy book in accordance with the effectiveness determination result and stores the second copy book. Further, the sort script converting device 300 may convert the sort field by referring to the stored second copy book. By doing this, when the sort script encoding is maintained in the Unix environment not by the ASCII, but by the EBCDIC, the sort script converting device 300 according to the exemplary embodiment of the present disclosure automatically converts the individual JCL. Therefore, as compared with the method of the related art, high speed and precision may be secured.

The sort script converting device 300 according to the exemplary embodiment of the present disclosure may be an OFMiner. The OFMiner may include an analyzing system which performs parsing and analyzing jobs for assets (a JCL, a JCL procedure, a Cobol source, a copybook, or a map) of the mainframe to make a database thereof and extracts information required for data migration or asset analysis (to understand the entire system) for performing an actual project.

Figure 2:
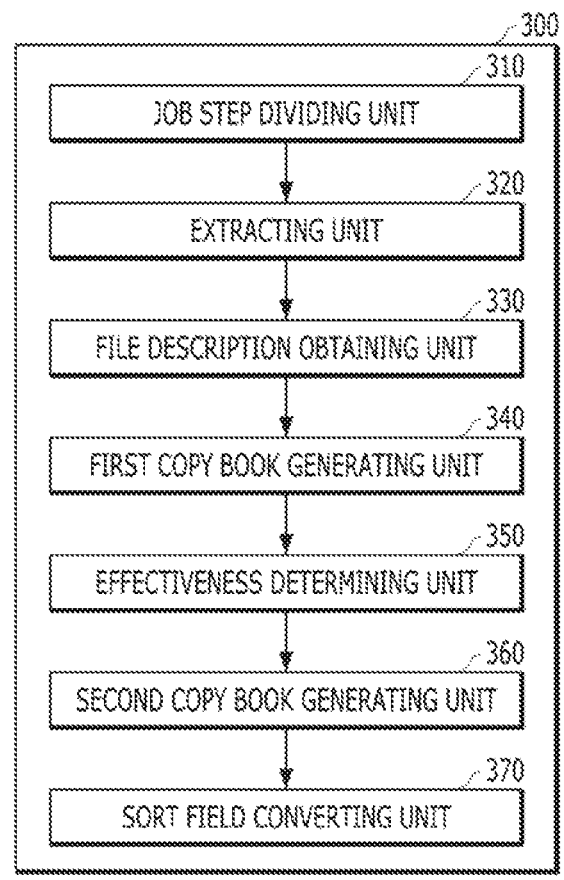
FIG. 2 is a block diagram illustrating an internal configuration of a sort script converting device to reuse a JCL in a different encoding environment according to an exemplary embodiment of the present disclosure.

FIG. 2 is a block diagram illustrating an internal configuration of a sort script converting device to reuse a JCL in a different encoding environment according to an exemplary embodiment of the present disclosure.

Referring to FIG. 2, the sort script converting device 300 according to the exemplary embodiment of the present disclosure may include a job step dividing unit 310, an extracting unit 320, a file description obtaining unit 330, a first copy book generating unit 340, an effectiveness determining unit 350, a second copy book generating unit 360, and a sort field converting unit 370.

The job step dividing unit 310 may divide one or more job steps in the job control language (JCL). The JCL may include one or more job steps. Each job step may include at least one of an executable program (PGM), a dataset name (DSN), and a data description (DD).

The extracting unit 320 may extract the executable program (PGM), the dataset name (DSN), and the data description (DD) from the job step. The executable program (PGM) in the JCL may be configured in the EXEC statement. In one exemplary embodiment, the executable program may include a COBOL program and a SORT program, but the scope of the present disclosure is not limited thereto. The dataset name (DSN) may be confirmed in the DD statement of the JCL. The dataset in the mainframe system 100 may correspond to a file of the open system 200. The dataset name to be used in the DD statement, an input/output device to be used, a location of the dataset, and an allocating method may be designated.

The file description obtaining unit 330 may obtain a file description (FD) corresponding to the data description from the executable program source corresponding to the executable program. For example, when the executable program is COBOL, the file description obtaining unit 330 may search for a COBOL program source corresponding to the executable program. The COBOL program source may be stored in advance in the database. Thereafter, the file description may be obtained from the searched COBOL program source. In this case, the obtained file description may include a file description corresponding to the data description. That is, the file description obtaining unit 330 may obtain a corresponding file description based on the data description.

The first copy book generating unit 340 may generate the first copy book based on the file description obtained by the file description obtaining unit 330. That is, the file description obtaining unit 330 obtains a layout of data corresponding to the dataset name in the file description and generates the first copy book using the obtained layout.

The effectiveness determining unit 350 determines the effectiveness by comparing the first copy book generated by the first copy book generating unit 340 with the sort field included in the job step. When the sort field included in the job step corresponds to the first copy book, the effectiveness may be approved.

The second copy book generating unit 360 may designate or set the first copy book as a second copy book in accordance with the determination result of the effectiveness determining unit 350. It is checked whether the sort field included in the JCL is a sort field which is used in the open system 200 and the second copy book whose effectiveness is approved may be used as a basic material to convert the sort field if necessary.

The sort field converting unit 370 may convert the sort field included in the job control language by referring to the second copy book. The sort field included in the JCL is not always converted. The sort field needs to be converted only when the same result is not obtained using the sort field included in the JCL in the open system 200.

Figure 3:
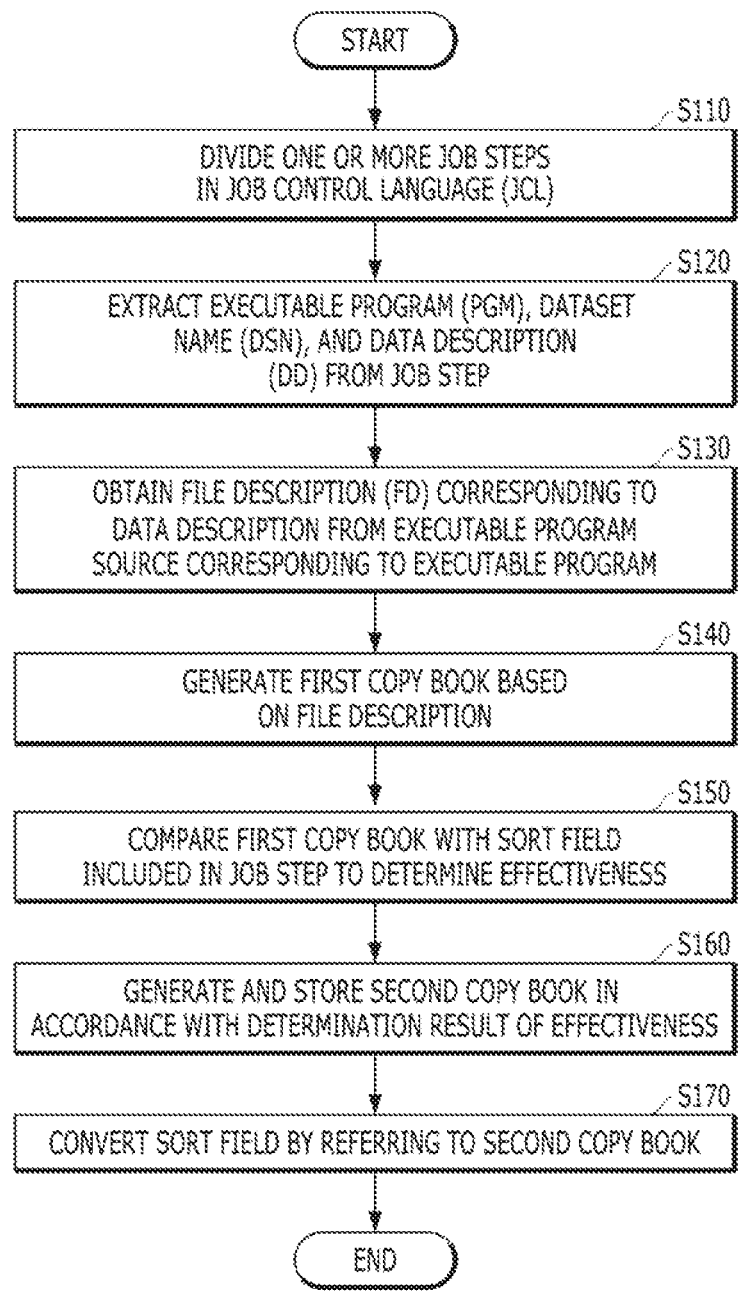
FIG. 3 is a flowchart illustrating a sort script converting method to reuse a JCL in a different encoding environment according to an exemplary embodiment of the present disclosure.

FIG. 3 is a flowchart illustrating a sort script converting method to reuse a JCL in a different encoding environment according to an exemplary embodiment of the present disclosure.

Referring to FIG. 3, the job step dividing unit 310 may divide one or more job steps in the job control language (JCL) in step S110.

The JCL includes a job statement, an EXEC statement, and a DD statement. As described above, the job statement notifies the operating system of the starting of the job and designates information for dividing the job and a parameter required to perform the job. The job step starts with an EXEC statement which designates a name of a program to be executed and one job step ends when the job step meets a next EXEC statement, a job statement, or a NULL statement. The DD statement designates a dataset which is required by the program and designates a dataset name to be used, an input/output device to be used, a location of the dataset, an allocating method, and other dataset characteristics.

Figure 4:
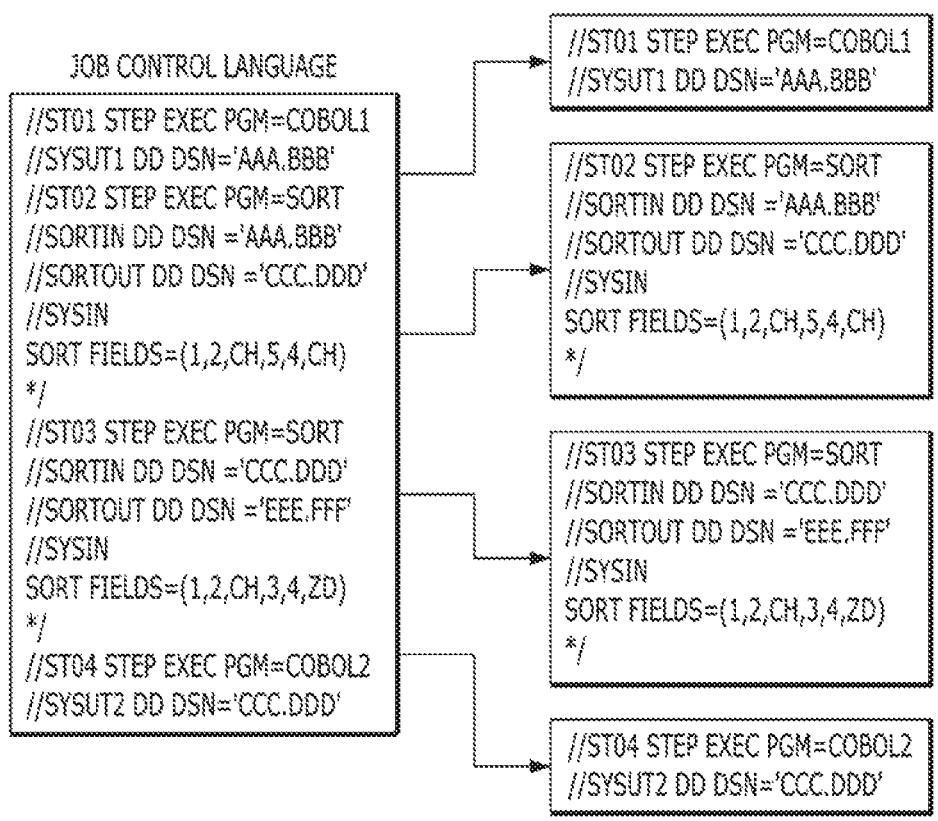
FIG. 4 illustrates a job control language according to an exemplary embodiment of the present disclosure.

FIG. 4 illustrates a job control language according to an exemplary embodiment of the present disclosure.

Referring to FIG. 4, the JCL according to an exemplary embodiment of the present disclosure is divided into four job steps ST01, ST02, ST03, and ST04. Here, for convenience of clear description of an exemplary embodiment of the present disclosure, four job steps are described as examples. However, the job step is not limited thereto. It is confirmed that the EXEC statement and the DD statement are included in each job step ST01, ST02, ST03, and ST04 and specifically, in the job step ST02, the sort program is used and the sorting of the dataset is defined by the sort field.

Referring to FIG. 3 again, in step S120, the extracting unit 320 may extract the executable program (PGM), the dataset name (DSN), and the data description (DD) from the job step. In the job step ST01 of FIG. 4, it is confirmed that the executable program (PGM) is COBOL1, the dataset name (DSN) is AAA.BBB, and the data description (DD) is SYSUT1. The executable program source may be specified using the PGM statement in the JCL. In this case, there are lots of file descriptions (FD) defined in the corresponding executable program source. Among the file descriptions of the executable program, a DD (SYSUT1) defined in the data description of the JCL is allocated to a file description in a SELECT statement of the executable program, so that the data description is requested. That is, only when the file description is understood, the copybook may be created by data declaration of the file description.

In the job step ST02 of FIG. 4, it is confirmed that the executable program (PGM) is SORT, the dataset name (DSN) is AAA.BBB, and the sort field is SORT FIELDS=(1, 2, CH, 5, 4, CH). Here, "1" indicates LOCATION (a location of CONTROL FIELDS in a SAM file), "2" indicates LENGTH (a length of the CONTROL FIELDS), and "CH" indicates DATA FORMAT (a data type of the CONTROL FIELDS). That is, it is understood that in the dataset of AAA.BBB included in the job step ST02, two bytes from a first byte are character (CH) sorting and four bytes from a fifth byte are character (CH) sorting. If SORT FIELDS=(1, 2,CH,5,4,BI), four bytes from the fifth byte may be number (BI) sorting.

By the same method, in the job step ST03, it is confirmed that the executable program (PGM) is SORT, the dataset name (DSN) is CCC.DDD, and the sort field is SORT FIELDS=(1, 2, CH, 3, 4, ZD). That is, it is understood that in the dataset of CCC.DDD included in the job step ST03, two bytes from a first byte are character (CH) sorting and four bytes from a third byte are zone decimal (ZD) sorting. If SORT FIELDS=(1,2,CH,3,4,PD), four bytes from the third byte may be packed decimal (PD) sorting.

A method of extracting the executable program (PGM), the dataset name (DSN), and the data description (DD) from the job step by the extracting unit 320 will be described in detail below. First, when the executable program used in the job step is a SORT program, the dataset name is extracted in the first job step including the SORT program. When it is confirmed that EXEC PGM=SORT in the job step ST02 of FIG. 4. AAA.BBB which is a name of the dataset to be processed is extracted. Thereafter, the executable program and the data description are extracted in the second job step including the dataset name. Since the name AAA.BBB of the dataset is included in the job step ST01 of FIG. 4, the executable program PGM=COBOL1 and the data description SYSUT1 may be extracted. Further, the SORT FIELDS corresponding to the dataset name may be extracted in the first job step. In summary, the sort information may be configured in the job step ST02 as represented in Table 1.

TABLE 1

DSN=AAA.BBB
PGM=COBOL1 of ST01
DD=SYSUT1 of ST01
SORTFIELD=1,2,CH,5,4,CH

The sort information may be configured in the job step ST03 as represented in Table 2.

TABLE 2

DSN=CCC.DDD
PGM=COBOL2 of ST04
DD=SYSUT2 of ST04
SORTFIELD=1,2,CH,3,4,ZD

Figure 5:
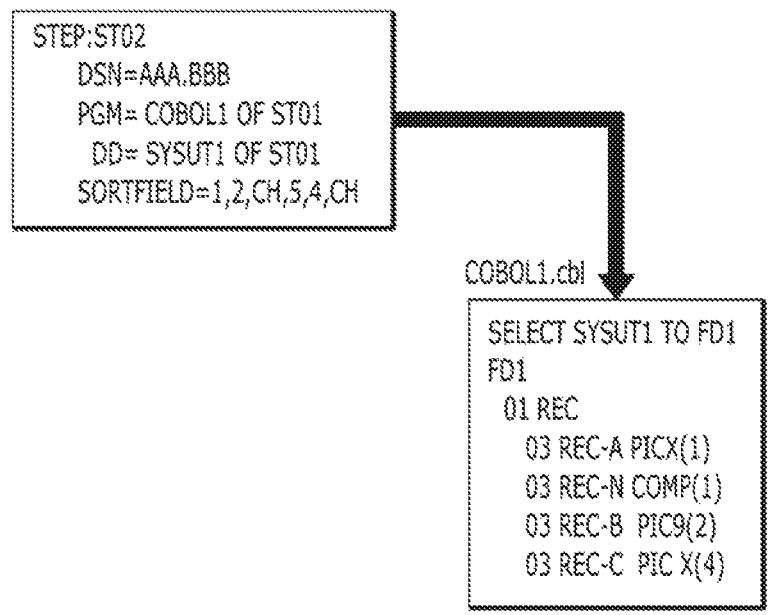
FIG. 5 is a job step of an executable program and a used executable program source according to an exemplary embodiment of the present disclosure.

FIG. 5 is a job step of an executable program and a used executable program source according to an exemplary embodiment of the present disclosure.

Referring to FIGS. 3 to 5, the file description obtaining unit 330 may obtain a file description (FD) corresponding to the data description from the executable program source corresponding to the executable program in step S130. First, an executable program source (COBOL.cb1) corresponding to the executable program (COBOL1) is searched from the database and a file description corresponding to the data description may be extracted from the executable program source. The layout of data corresponding to the dataset name is obtained from the extracted file description and the first copy book may be generated based on the obtained layout. For example, since the executable program is COBOL1 in the job step ST02, the database is searched to use the executable program source, that is, COBOL.cb1.

In the JCL, it is declared that EXEC PGM of the job step ST01 is COBOL1, so that it is understood that the layout of the dataset is defined in the COBOL1.cb1 source with this information. In this case, the COBOL1.cb1 may declare several file descriptions. Since the data description of the dataset AAA.BBB is SYSUT1, a statement which uses SYSUT1 is found from the SELECT statement of COBOL.cb1. It is understood that the SYSUT1 DD is allocated to the FD1 through the SELECT SYSUT1 to FD1 statement and the layout of the data is present in the FD1. Therefore, the first copy book generating unit 340 may generate the first copy book based on the file description in step S140, with reference to the statement.

Figure 6:
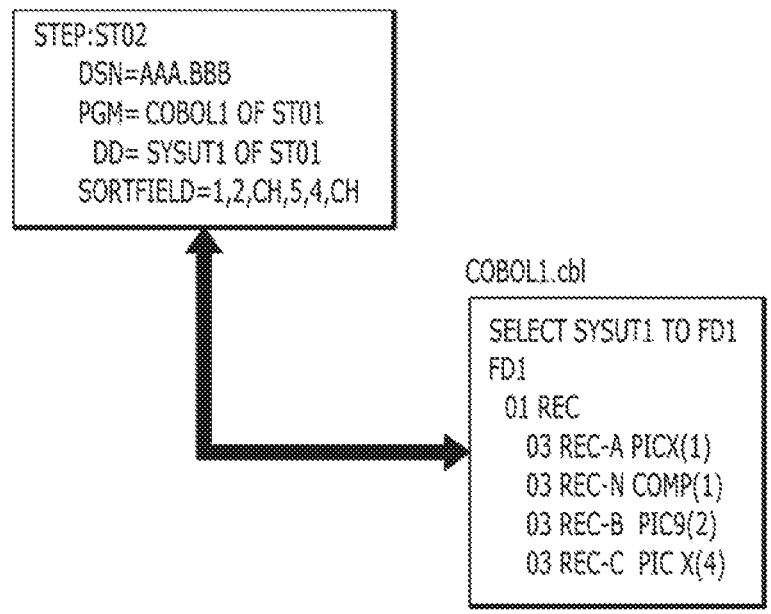
FIG. 6 illustrates a method for determining effectiveness of a first copy book according to an exemplary embodiment of the present disclosure.

FIG. 6 illustrates a method for determining effectiveness of a first copy book according to an exemplary embodiment of the present disclosure.

Referring to FIGS. 3 and 6, the effectiveness determining unit 350 determines effectiveness by comparing the first copy book with the sort field included in the job step in step S150. In order to determine the effectiveness, the effectiveness determining unit 350 determines whether the first copy book matches the sort field by comparing the first copy book with the sort field of the data corresponding to the dataset name. As illustrated in FIG. 6, the first copy book (01 REC 03 REC-A PICX(1) 03 REC-N COMP(1) 03 REC-B PIC9 (2) 03 REC-C PIC X(4)) is compared with SORTFIELD=1, 2,CH,5,4,CH of the job step ST02 to determine whether to match.

In step S160, when the first copy book matches the sort field as the determination result of the effectiveness, the second copy book generating unit 360 designates the first copy book as a second copy book and generates and stores the second copy book. Here, the generated second copy book may be used to convert the sort field.

In step S170, the sort field converting unit 370 converts the sort field by referring to the second copy book. Encodings of the main frame system 100 and the open system 200 are different from each other. For example, the main frame system 100 (for example, IBM) may use EBCDIC and the open system 200 (for example, the Unix environment) may use ASCII. However, due to the different encoding methods, the sort script in the main frame system 100 processes a part in which the number (BI) sorting is required in the Unix environment by character (CH) sorting. If the number (BI) sorting and the character (CH) sorting are not distinguished in the Unix environment, it is difficult to reuse the JCL in a different encoding environment.

Figure 7:
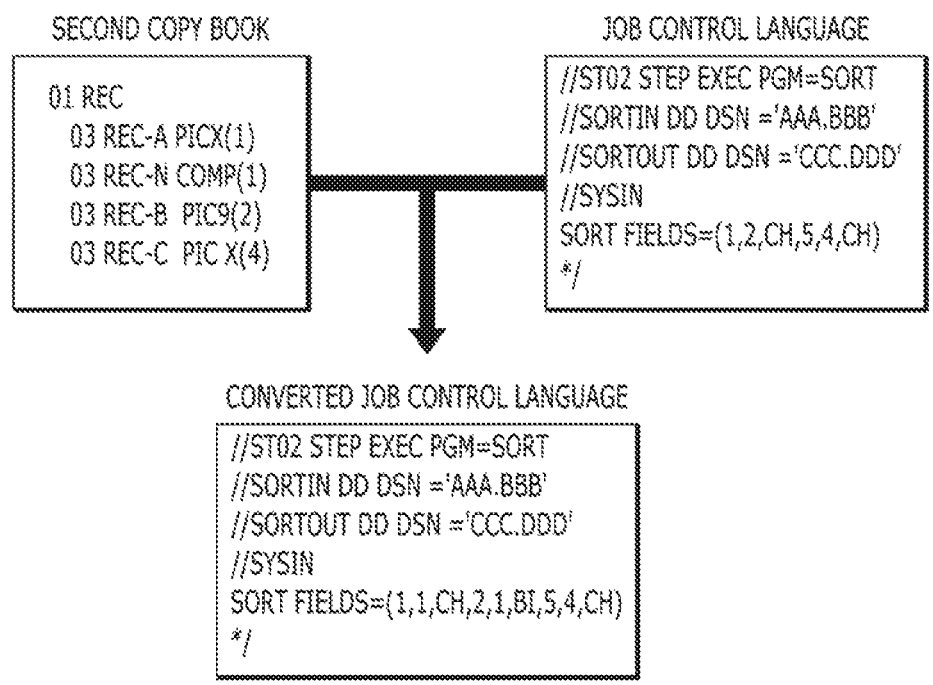
FIG. 7 illustrates a method for converting a sort field by referring to a second copy book according to an exemplar) embodiment of the present disclosure.

FIG. 7 illustrates a method for converting a sort field by referring to a second copy book according to an exemplary embodiment of the present disclosure.

Referring to FIG. 7, the sort field converting unit 370 compares the second copy book with the sort field SORT FIELDS=(1,2,CH,5,4,CH) of the job step ST02. The sort field of the job field ST02 is defined such that two bytes from the first byte is the character (CH) sorting. However, referring to the second copy book, when the actual sorting of the dataset AAA.BBB is configured such that when one byte from the first byte is character (CH) sorting and one byte from the second byte is the number (BI) sorting, the sort field may be converted from SORT FIELDS=(1,2,CH,5,4,CH) to SORT FIELDS=(1,1,CH,2,1,BI,5,4,CH). When SORT FIELDS=(1,1,CH,2,1,BI,5,4,CH) is used in the open system 200, the dataset AAA.BBB in the open system 200 may be configured such that one byte from the second byte is the number (BI) sorting.

Figure 8:
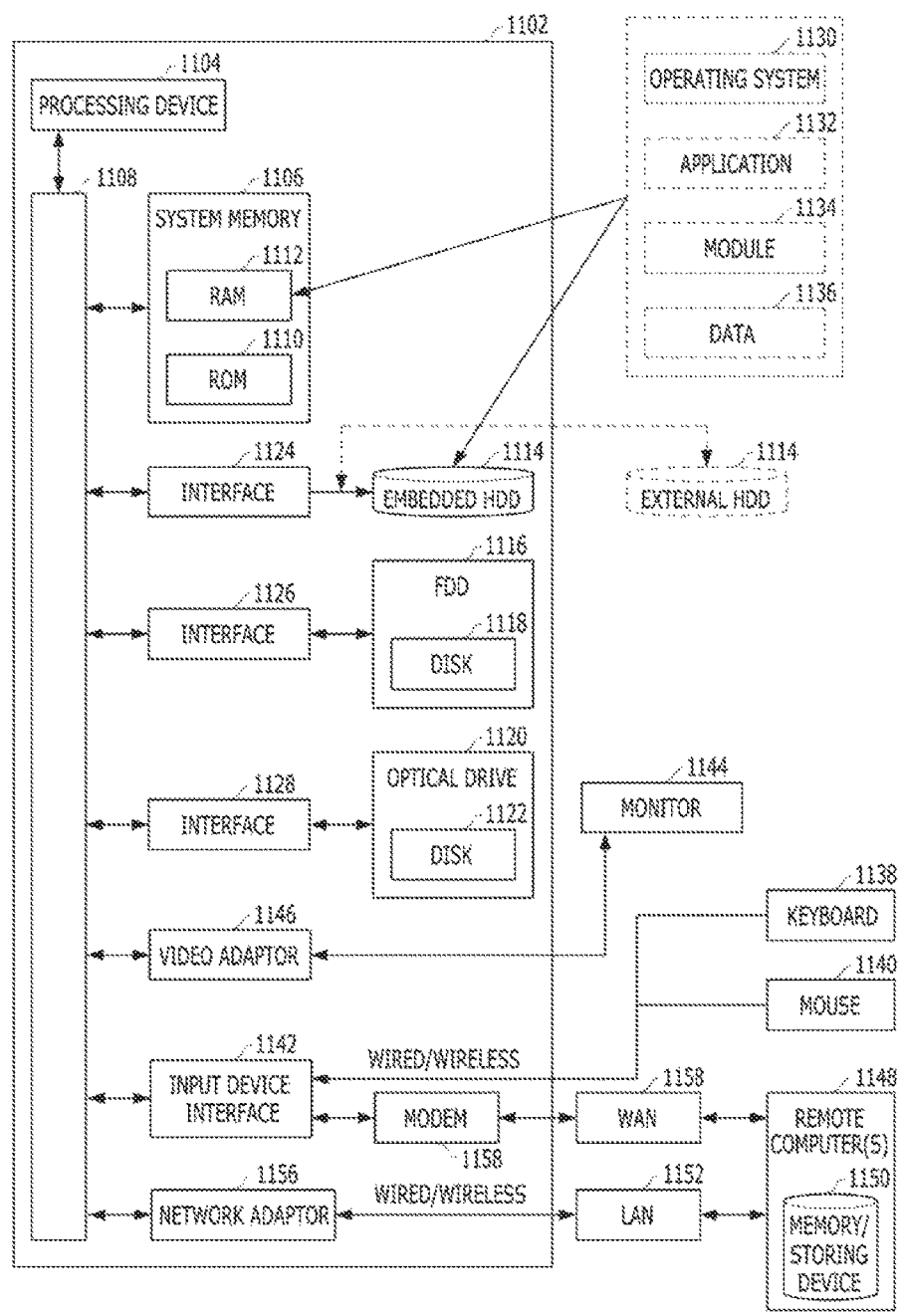
FIG. 8 illustrates a block diagram of a computer which executes a sort script converting program to reuse a JCL in a different encoding environment according to an exemplary embodiment of the present disclosure.

FIG. 8 is a block diagram illustrating a computer which executes a sort script converting program to reuse a JCL in a different encoding environment according to an exemplary embodiment of the present disclosure.

Referring to FIG. 8, a computing environment suitable for implementing various aspects according to an exemplary embodiment of the present disclosure will be briefly and generally described.

Even though the present disclosure is generally described in regard to a computer executable instruction which may be executable in one or more computers, it is obvious to those skilled in the art that the present disclosure may be implemented by being coupled with other program modules and/or a combination of hardware and software.

Generally, the program module includes a routine, a program, a component, a data structure, or the like which performs a specific task or implements a specific abstract data type. Further, those skilled in the art may understand that the method of the present disclosure may be embodied by other computer system configurations including not only a single processor or a multi-processor computer system, a mini computer, and a main frame computer, but also a personal computer, a hand-held computing apparatus, microprocessor based or programmable home appliances (which may be connected to one or more related devices to be operated).

The illustrated aspects of the present disclosure may further be embodied in a distributed computing environment in which some tasks are performed by remote processing devices which are connected to each other through a communication network. In the distributed computing environment, a program module may be located in both local and remote memory storing devices.

Generally, a computer includes various computer readable media. Any computer accessible medium may be a computer readable medium. The computer readable medium includes both volatile and non-volatile media and portable and non-portable media. As an example which is not limited thereby, the computer readable medium may include a computer storage medium and a communication medium. The computer storage medium includes volatile and non-volatile media, and portable and non-portable media which are implemented by an arbitrary method or technique which stores information such as a computer readable instruction, a data structure, a program module or other data. The computer storage medium includes a RAM, a ROM, an EEPROM, a flash memory, or other memory techniques, a CD-ROM, a digital video disk (DVD), or other optical disk storing devices, a magnetic cassette, a magnetic tape, a magnetic disk storing device, or other magnetic storing devices, or other arbitrary media which are accessed by a computer and is used to store desired information, but is not limited thereto.

The communication medium generally implements a computer readable instruction, a data structure, a program module, or other data in a modulated data signal such as a carrier wave or other transport mechanisms and includes all information transfer media. The term modulated data signal refers to a signal in which one or more properties of the signal are set or changed to encode information in the signal. As an example which is not limited thereby, a communication medium includes a wired medium such as a wired network or direct wired connection and a wireless medium such as sound, RF, infrared ray, or other wireless media. It is considered that a combination of any of the above-mentioned media may also be included in the scope of the computer readable medium.

An exemplary environment 1100 including a computer 1102 which implements various aspects of the present disclosure is illustrated and the computer 1102 includes a processing device 1104, a system memory 1106, and a system bus 1108. The system bus 1108 connects system components including a system memory 1106 (not to be limited thereto) to the processing device 1104. The processing device 1104 may be an arbitrary processor among various commercial processors. A dual processor and other multiprocessor architectures may also be used as the processing device 1104.

The system bus 1108 may be any of several types of bus structures which is additionally connected to a local bus which uses any one of a memory bus, a peripheral device bus, and various commercial bus architectures. The system memory 1106 includes a read only memory (ROM) 1110 and a random access memory RAM 1112. A basic input/output system (BIOS) is stored in a non-volatile memory 1110 such as a ROM, an EPROM, and an EEPROM and the BIOS includes a basic routine which assists to transmit information between components in the computer 1102 while the computer is activated. The RAM 1112 may further include a fast RAM such as a static RAM for caching data.

The computer 1102 further includes an embedded hard disk drive (HDD) 1114 (for example, EIDE, SATA) which may also be configured as an external disk in an appropriate chassis (not illustrated), a magnetic floppy disk drive (FDD) 1116 (for example, to read data from a portable diskette 1118 or record data therein), and an optical disk driver 1120 (for example, to read a CD-ROM disk 1112 or read data from other high quantity optical medium such as a DVD or record data therein). The hard disk drive 1114, the magnetic disk drive 1116, and the optical disk drive 1120 may be connected to the system bus 1108 through a hard disk drive interface 1124, a magnetic disk drive interface 1126, and an optical drive interface 1128. The interface 1124 for implementing an external drive includes at least one or both of universal serial bus (USB) and IEEE 1394 interface technique.

These drives and a computer readable medium related therewith provide non-volatile storage of data, a data structure, a computer executable instruction, or the like. In the case of the computer 1102, the drive and the medium correspond to storing arbitrary data as an appropriate digital type. In the description of the computer readable medium, an HDD, a portable magnetic disk, and a portable optical medium such as a CD or a DVD have been mentioned. However, it is well known to those skilled in the art that other types of computer readable medium such as a zip drive, a magnetic cassette, a flash memory card, a cartridge, or the like may also be used in an exemplary operating environment and the arbitrary medium may include a computer executable instruction which performs the methods of the present disclosure.

A large number of program modules including an operating system 1130, one or more application programs 1132, other program module 1134, and program data 1136 may be stored in the drive and the RAM 1112. The operating system, the application, module and/or all or a part of data are also cached by the RAM 1112. It is obvious that the present disclosure may be implemented by various commercially applicable operating systems or a combination of operating systems.

A user may input a command and information to the computer 1102 through one or more wired/wireless input devices, for example, a pointing device such as a keyboard 1138 and a mouse 1140. Other input devices (not illustrated) may include a microphone, an IR remote controller, a joystick, a game pad, a stylus pen, a touch screen, or the like. These and other input devices are sometimes connected to the processing device 1108 through an input device interface 1142 which is connected to the system bus 1104, but may be connected by a parallel port, an IEEE 1394 serial port, a game port, a USB port, an IR interface, or other interfaces.

A monitor 1144 or other types of display devices are also connected to the system bus 1108 through an interface such as a video adaptor 1146. In addition to the monitor 1144, a computer generally includes other peripheral output devices (not illustrated) such as a speaker or a printer.

The computer 1102 may operate in a networked environment using logical connection of remote computer(s) 1148 to one or more remote computers through wired and/or wireless communication. The remote computer(s) 1148 may be a workstation, a server computer, a router, a personal computer, a portable computer, a microprocessor based amusement machine, a peer device, or other general network node and generally, includes a large number of or all the components which have been described for the computer 1102. However, for the purpose of simplicity, only a memory storing device 1150 is illustrated. The illustrated logical connection includes wired/wireless connection to a local area network (LAN) 1152 and/or larger network, for example, a wide area network (WAN) 1154. The LAN and WAN networking environments are general in an office and a company and facilitate an enterprise-wide computer network such as intranet and these are all connected to a worldwide computer network, for example, the Internet.

When the computer 1102 is used in the LAN networking environment, the computer 1102 is connected to a local network 1152 through a wired and/or wireless communication network interface or an adaptor 1156. The adaptor 1156 allows wired or wireless communication to the LAN 1152 and the LAN 1152 also includes a wireless access point provided therein to communicate with the wireless adaptor 1156. When the computer 1102 is used in the WAN networking environment, the computer 1102 has other means, for example, includes a modem 1158 or is connected to a communication server on the WAN 1154, or uses Internet to set communication through the WAN 1154.

The modem 1158 which may be an embedded or external, and a wired or wireless device is connected to the system bus 1108 through the serial port interface 1142. In a networked environment, program modules described for the computer 1102 or a part thereof may be stored in the remote memory/storing device 1150. It is understood well that the illustrated network connection is an example and other means to set a communication link between computers may be used.

The computer 1102 performs operations to communicate with an arbitrary wireless device or entity which is disposed through wireless communication to operate, for example, a printer, a scanner, a desktop and/or portable computer, a portable data assistant (PDA), a communication satellite, arbitrary equipment or location (for example, a kiosk, a newspaper stand, or a rest room) related with a wireless detectable tag, and a telephone. This includes at least Wi-FI and Bluetooth™ wireless technology. Therefore, communication may be a previously defined structure such as a network of the related art or simply ad hoc communication between at least two devices.

Wireless fidelity (Wi-Fi) enables connection to the Internet from a sofa at home, a bed in a hotel room, or a conference room in the office without using a wired line. The Wi-Fi is a wireless technique such as a cell phone which allows such a device, for example, a computer to transmit and receive data indoors and outdoors, that is, in any place within a coverage of a base station. The Wi-Fi network uses a wireless technology called IEEE 802.11 (a,b,g, or the like) to provide safe, reliable, and fast wireless connection. Wi-Fi is used to connect computers to each other or to the Internet, and a wired network (IEEE 802.3 or Ethernet is used). The Wi-Fi network operates at a 11 Mbps (802.11a) or 54 Mbps (802.11b) data rate in an unauthorized wireless band of 2.4 and 5 GHz or operates in a product including both bands (dual band). Therefore, the network may provide an actual-world performance similar to a basic 10 BaseT wired Ethernet network used in many offices.

Figure 9:
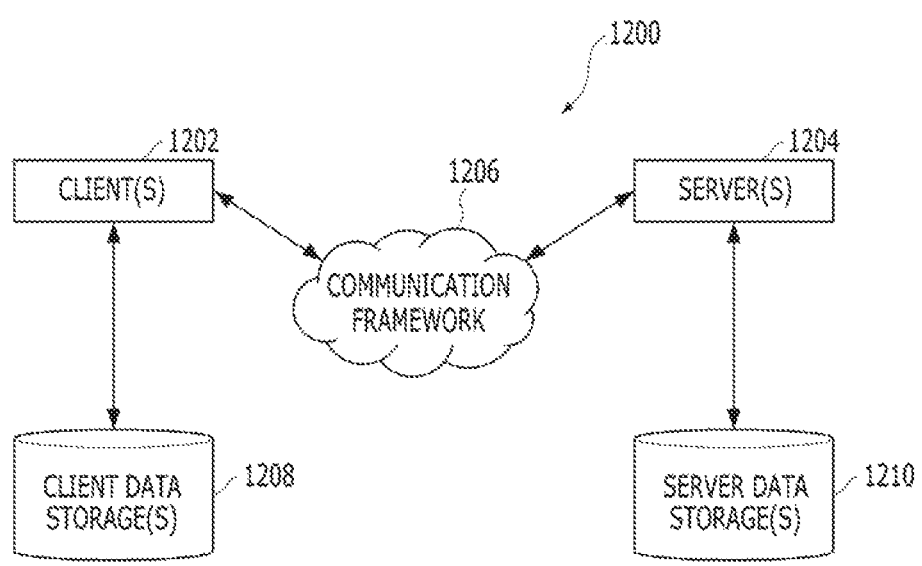
FIG. 9 illustrates a schematic block diagram of an exemplary computing environment which executes a sort script converting program to reuse a JCL in a different encoding environment according to an exemplary embodiment of the present disclosure.

FIG. 9 illustrates a schematic block diagram of an exemplary computing environment which executes a sort script converting program to reuse a JCL in a different encoding environment according to an exemplary embodiment of the present disclosure.

Referring to FIG. 9, a system 1200 includes one or more clients 1202. The client(s) 1202 may be hardware and/or software (for example, a thread, a process, or a computing device). For example, the client(s) 1202 may store cookie(s) and/or related situational information using the exemplary embodiment.

The system 1200 further includes one or more servers 1204. The server(s) 1204 may also be hardware and/or software (for example, a thread, a process, or a computing device). The server 1204 may store a thread which performs conversion using the exemplary embodiment. One possible communication between the client 1202 and the server 1204 may be a type of data packet which is configured to be transmitted between two or more computer processors. The data packet may include a cookie and/or related situational information, for example. The system 1200 includes a communication framework 1206 (for example, a gjobal communication network such as the Internet) which may be used to easily perform the communication between the client(s) 1202 and the server(s) 1204.

The communication may be easily performed through wired (including an optical fiber) and/or wireless techniques. The client(s) 1202 operates by being connected to one or more client data storage(s) 1208 which is used to store local information (for example, the cookie(s) and/or related situational information) in the client(s) 1202. Similarly, the server(s) 1204 operates by being connected to one or more server data storage(s) 1210 which is used to store local information in the server(s) 1204.

While the present disclosure has been described with reference to the preferred embodiments, it will be understood by those skilled in the art that various changes and modifications of the present disclosure may be made without departing from the spirit and scope of the present disclosure as defined in the following claims.

What is claimed is:

1. A non-transitory computer-readable medium storing a sort script converting computer program to reuse a job control language in a different encoding environment, the sort script converting computer program allowing one or more processors of a sort script converting computing device to perform the following process, the process comprising:

(A) dividing, by a job step divider, a job control language (JCL) into one or more job steps for reuse in a different encoding environment, the dividing of JCL based on an EXEC statement which is included in the one or more job steps, wherein the job step divider determines divided points of the JCL as points of the appearance of the EXEC statement while the job step divider reads the JCL, and wherein the EXEC statement designates a name of a program to be executed in the one or more job steps;

(B) extracting, by an extractor, an executable program (PGM) specifying an executable program source, a dataset name (DSN) identifying a dataset to be processed in a corresponding job step, and a data description (DD) from the divided one or more job steps respectively;

(C) determining, by a file description obtainer, a layout of data corresponding to a dataset name in a file description (FD), by searching for the executable program source corresponding to the executable program in a database, extracting the file description (FD) corresponding to the data description in the executable program source, and obtaining the file description (FD) corresponding to the data description from an executable program source corresponding to the executable program;

(D) generating, by a first copy book generator, a first copy book based on the layout of data;

(E) determining, by an effectiveness determiner, validity of the first copy book based on determining whether a sort field of the first copy book matches the sort field by comparing the sort field of the first copy book with a sort field of data corresponding to the dataset name; and (F) generating and storing, by a second copy book generator, a second copy book by setting the first copy book as the second copy book when the sort field of the first copy book matches the sort field of data as a result obtained by comparing the first copy book with the sort field of data corresponding to the dataset name.

2. The non-transitory computer-readable medium of claim 1, further comprising:

(G) converting, by a sort field converter, the sort field by referring to the second copy book.

3. The non-transitory computer-readable medium of claim 1, wherein the (B) extracting includes:

extracting, by the extractor, the dataset name in a first job step including a sort program when the executable program used in the one or more job steps is the sort program; and extracting, by the extractor, the executable program and the data description in a second job step including the dataset name.

4. The non-transitory computer-readable medium of claim 3, further comprising:

extracting, by the extractor, a sort field corresponding to the dataset name in the first job step.

5. The non-transitory computer-readable medium of claim 1, wherein the executable program includes a common business-oriented language (COBOL).

6. A sort script converting method, which is performed in a sort script converting computing device including one or more processors and memory configured to store commands executable in the processors, to reuse a job control language in a different encoding environment, the method comprising:

(A) dividing, by a job step divider, a job control language (JCL) into one or more job steps for reuse in a different encoding environment, the dividing of JCL based on an EXEC statement which is included in the one or more job steps, wherein the job step divider determines divided points of the JCL as points of the appearance of the EXEC statement while the job step divider reads the JCL, and wherein the EXEC statement designates a name of a program to be executed in the one or more job steps;

(B) extracting, by an extractor, an executable program (PGM) specifying an executable program source, a dataset name (DSN) identifying a dataset to be processed in a corresponding job step, and a data description (DD) from the divided one or more job steps respectively;

(C) determining, by a file description obtainer, a layout of data corresponding to the dataset name in a file description (FD), by searching for the executable program source corresponding to the executable program in a database, extracting the file description (FD) corresponding to the data description in the executable program source, and obtaining the file description (FD) corresponding to the data description from an executable program source corresponding to the executable program;

(D) generating, by a first copy book generator, a first copy book based on the layout of data;

(E) determining, by an effectiveness determiner, validity of the first copy book based on determining whether a sort field of the first copy book matches the sort field by comparing the sort field of the first copy book with a sort field of data corresponding to the dataset name; and (F) generating and storing, by a second copy book generator, a second copy book by setting the first copy book as the second copy book when the sort field of the first copy book matches the sort field of data as a result obtained by comparing the first copy book with the sort field of data corresponding to the dataset name.

7. The sort script converting method of claim 6, further comprising:

(G) converting, by a sort field converter, the sort field by referring to the second copy book.

8. The sort script converting method of claim 6, wherein the (B) extracting includes:

extracting, by the extractor, the dataset name in a first job step including a sort program when the executable program used in the one or more job steps is the sort program; and extracting, by the extractor, the executable program and the data description in a second job step including the dataset name.

9. The sort script converting method of claim 8, further comprising:

extracting, by the extractor, a sort field corresponding to the dataset name in the first job step.

10. The sort script converting method of claim 6, wherein the executable program includes a common business-oriented language (COBOL).

11. A sort script converting computing device to reuse a job control language in a different encoding environment, the computing device comprising:

one or more processors; and memory configured to store commands executable by the processors;

wherein the one or more processors include:

a job step divider configured to divide a job control language (JCL) into one or more job steps for reuse in a different encoding environment, the dividing of JCL based on an EXEC statement which is included in the one or more job steps, wherein the job step divider determines divided points of the JCL as points of the appearance of the EXEC statement while the job step divider reads the JCL, and wherein the EXEC statement designates a name of a program to be executed in the one or more job steps;

an extractor configured to extract an executable program (PGM) specifying an executable program source, a dataset name (DSN) identifying a dataset to be processed in a corresponding job step, and a data description (DD) from the divided one or more job steps respectively;

a file description obtainer configured to:
  determine a layout of data corresponding to the dataset name in a file description (FD), by searching for the executable program source corresponding to the executable program in a database, extracting the file description (FD) corresponding to the data description in the executable program source; and
  obtain the file description (FD) corresponding to the data description from the executable program source corresponding to the executable program;

a first copy book generator configured to generate a first copy book based on the layout of data;

an effectiveness determiner configured to determine validity of the first copy book based on determining whether a sort field of the first copy book matches the sort field by comparing the sort field of the first copy book with a sort field of data corresponding to the dataset name; and a second copy book generator configured to generate and store a second copy book by setting the first copy book as the second copy book when the sort field of the first copy book matches the sort field of data as a result obtained by comparing the first copy book with the sort field of data corresponding to the dataset name.

* * * * *